US009434540B2

(12) United States Patent
Goedken et al.

(10) Patent No.: US 9,434,540 B2
(45) Date of Patent: Sep. 6, 2016

(54) FRONT LOAD FORK ASSEMBLY FOR SIDE LOAD OR REAR LOAD CONTAINERS

(71) Applicant: Kann Manufacturing Corporation, Guttenberg, IA (US)

(72) Inventors: Kenneth D. Goedken, Dubuque, IA (US); Jared L. Rowland, Dyersville, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 605 days.

(21) Appl. No.: 13/803,776

(22) Filed: Mar. 14, 2013

(65) Prior Publication Data

US 2014/0126983 A1 May 8, 2014

Related U.S. Application Data

(60) Provisional application No. 61/723,982, filed on Nov. 8, 2012.

(51) Int. Cl.

| | |
|---|---|
| ***B65G 65/34*** | (2006.01) |
| ***B65F 3/04*** | (2006.01) |
| *B65F 3/02* | (2006.01) |

(52) U.S. Cl.

CPC ........ *B65F 3/041* (2013.01); *B65F 2003/0266* (2013.01); *B65F 2003/0269* (2013.01); *B65F 2003/0273* (2013.01); *B65F 2003/0283* (2013.01)

(58) Field of Classification Search

CPC .............. B65F 1/122; B65F 2003/279; B65F 2003/273; B65F 2003/266; B65F 2003/269; B65F 2003/283; B65F 3/041; B65F 3/04; B65F 3/046

USPC ........................................................ 414/408

See application file for complete search history.

(56) References Cited

U.S. PATENT DOCUMENTS

| | | | | | |
|---|---|---|---|---|---|
| 3,016,157 | A * | 1/1962 | Brisson | B65F 3/04 | 294/68.3 |
| 3,702,662 | A * | 11/1972 | Davieau | B65F 3/041 | 414/303 |
| 4,349,305 | A * | 9/1982 | Wynn | B65F 3/04 | 414/403 |
| 4,715,767 | A * | 12/1987 | Edelhoff | B65F 1/122 | 294/68.26 |
| 5,829,944 | A * | 11/1998 | Szinte | B65F 3/041 | 414/406 |
| 5,890,865 | A * | 4/1999 | Smith | B65F 3/043 | 414/408 |
| 6,846,148 | B2 | 1/2005 | Riba Romeva et al. | | |

* cited by examiner

*Primary Examiner* — Michael McCullough
*Assistant Examiner* — Mark Hageman
(74) *Attorney, Agent, or Firm* — Brett D. Papendick; Shuttleworth & Ingersoll, PLC

(57) ABSTRACT

An adapter for lift arms of a front loading commodity collection truck includes a pair of forks, each of which can individually pivot from a position alongside the frame of the adapter to a position generally perpendicular to the frame of the adapter. Each fork includes elements to allow it to connect with either a side loadable refuse container or a rear end loadable refuse container. At least one fork is supported on a laterally telescoping assembly so that the fork can reach a refuse container located, away from the adapter on the street side of the collection truck.

13 Claims, 7 Drawing Sheets

FRONT LOAD FORK ASSEMBLY FOR SIDE LOAD OR REAR LOAD CONTAINERS

CROSS REFERENCE TO RELATED APPLICATIONS

This application claims priority under 35 USC §119 from copending provisional patent application entitled FRONT LOAD PIVOT FORK FOR SIDE LOAD OR REAR LOAD CONTAINERS, Ser. No. 61/723,982, filed Nov. 8, 2012. The disclosure of provisional patent application Ser. No. 61/723,982 is hereby incorporated in its entirety.

BACKGROUND OF THE INVENTION

Collection of refuse commodities (refuse or recyclables) including organic and recyclable wastes requires efficient collection from commercial, industrial and residential locations. In these environments, numerous bins and containers are often used to accommodate large amounts of waste and recyclable material, and difficulties arise in efficiently emptying all the individual bins and containers into the commodity collection truck.

Commodity collection trucks come in three main types: front end loading, rear end loading, and side loading. In each case, a commodity collection body of one of the three main types is mounted on a truck chassis so that the collection body can be transported on collection routes. Along such routes, individual refuse containers which are compatible with the type of commodity collection body being utilized can be emptied into the collection body and then the collection body can be transported to a transfer site, a recycling center, or to a landfill. In the case of front loading commodity collection bodies, lift arms are provided on the body which pivot about axles near the front lower corners of the collection body from a lowered position forward of the truck's cab to an elevated position above the intake hopper of the collection body. The lift arms include lift forks which can engage and lift a front-load style refuse container equipped with fork pockets to receive the fork tines. However, when a rear end load style container or a side load style container is encountered along a route, a front loading collection truck is unable to empty such a container into its intake hopper. Therefore, a second truck adapted to empty either rear end load containers or side load containers must be sent to empty such container.

In order to save fuel and labor expense, it would be useful for a front loading commodity collection body to be adaptable so that the lift forks could engage a container other than the usual one adapted for front loading, such a container having fork pockets located along opposing sidewalls of the front load style container. A commodity collection truck of the front load style would be very useful if it could engage and empty other than front load style refuse containers. A commodity collection truck equipped with such a collection body would allow a refuse collector to use a single truck to collect various types of commercial refuse containers.

SUMMARY OF THE INVENTION

The present invention relates to refuse collection bodies and particularly to front load collection bodies which are equipped with lift arms which raise a refuse container from a lowered position in front of the collection body to a raised, inverted position over a top load opening of the refuse collection body. This invention allows a front loading collection body to be converted easily to a collection body which can automatically unload a rear end load style (trunnion equipped) container or a side load style (hook equipped) container. The rear end load or side load containers can be located at either curb side or street side of the front loading commodity collection body.

A fork assembly is removable from the lift arms and includes a street-side fork and a curbside fork as well as an elongate rail which extends along the frame of the fork assembly. An elongate sleeve is selectively slidable along the rail. The street side fork is supported on the sleeve and may be moved from a retracted position to an extended position in order to reach out toward a container which is spaced away from the street side fork when the street side fork is in the retracted position.

Each fork is supported on the fork assembly such that the fork can pivot about a vertical axis and fold into a position alongside the frame of the fork assembly.

One or both forks may be equipped with hook receivers which may engage hooks on a conventional hook equipped side loading refuse container. The forks may alternatively be equipped with a pair of trunnion pockets for receiving the ends of a trunnion bar extending along the front wall of a rear end load style container. The forks need not be equipped with the same container engagement elements so that a rear end load container can be engaged with one fork and a side load container can be engaged with the other fork.

When a container has been attached to one or the other of the forks, the fork to which it is attached may be pivoted ninety degrees into position alongside the frame of the fork assembly and lever arms on the frame may be lowered to press against the top edges of opposing sidewalls of the container attached to the folded fork. The lever arms prevent the container from dropping from the fork assembly when the lift arms upend the container over the intake opening in the collection body.

It is a primary object of the invention to provide a fork assembly which may be easily and quickly attached to lift arms of a front loading commodity collection truck so that the front load forks can be utilized to grasp a commercial rear end load refuse container or a commercial side load refuse container so that the container can be emptied into the top intake opening of the front loading commodity collection body on the collection truck. It is a further object to provide a fork assembly which can telescope toward the street side of the of the truck to reach a commercial refuse container which is spaced away from the street side fork of the fork assembly.

It is yet another object of the invention to provide a front-loading commodity collection truck which can be used to collect trunnion equipped rear end load style refuse containers or hook equipped side load style refuse containers as well as to collect front load style refuse containers. It is therefore an additional object of the invention to reduce the number of commodity collection trucks needed by a commodity collector by providing a commodity collection vehicle which may be quickly adapted to collect refuse from any of a front loading, a side loading, or a rear end loading refuse container.

These and other salutary objects will become apparent from examination of the detailed description which follows.

DETAILED DESCRIPTION

Figure 1:
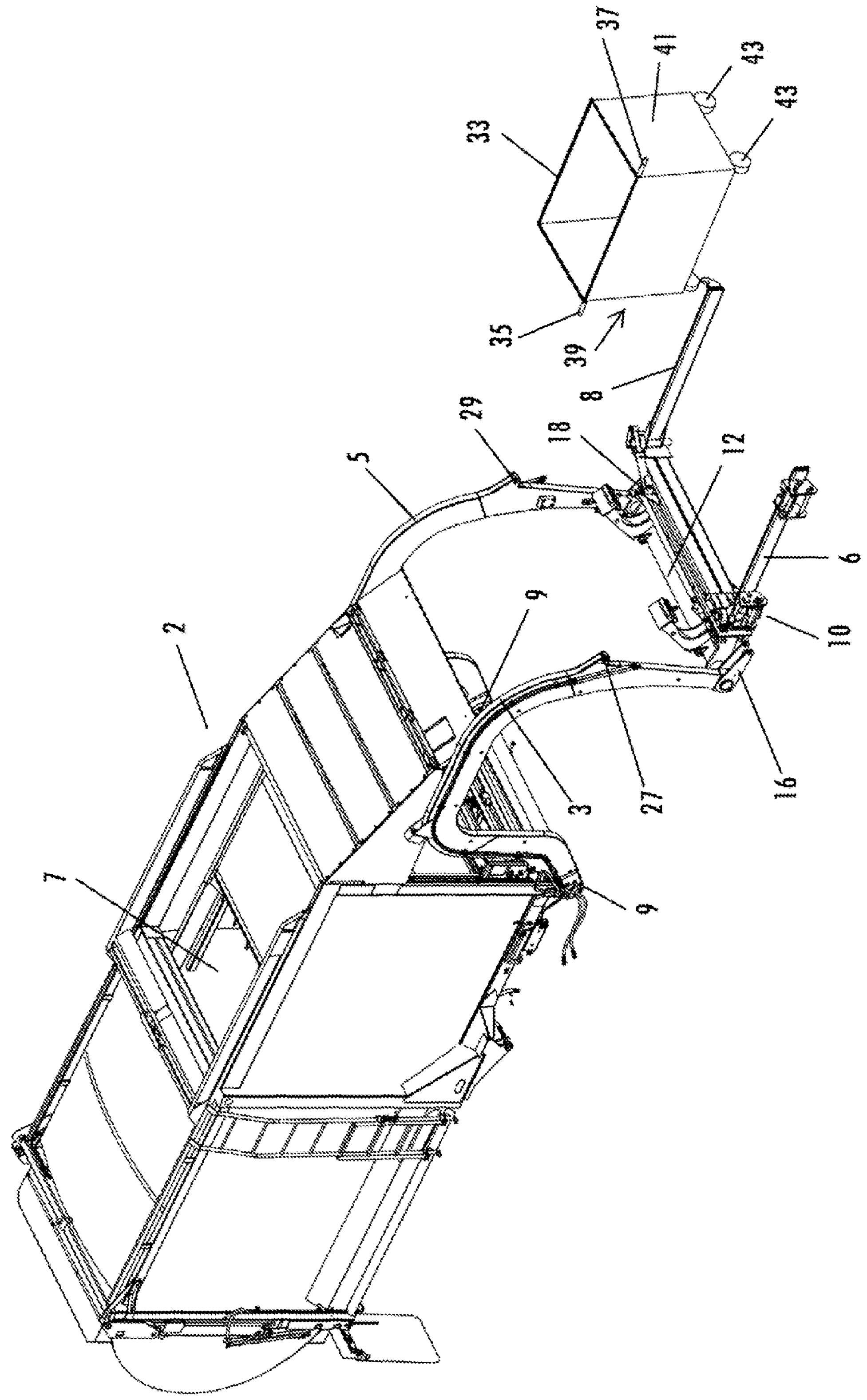
FIG. 1 shows a collection body in perspective, the body having been equipped with the invention, with a trunnion equipped container resting to the street side of the fork assembly of the invention.

Referring to FIGS. 1-7, it can be understood that invention fork assembly 10 is removably installed on main lift arms 3, 5 of a conventional front loading refuse collection body 2. Main lift arms 3, 5 are selectively pivotable together about coaxial main arm axles 9 carried on collection body 2. Lift arms 3, 5 can raise a commodity container carried on the fork assembly 10 to an inverted position above the load opening 7 at the top of the collection body 2.

In FIG. 1, a trunnion equipped container 33 is located a distance from the street side fork 8 of the invention fork assembly 10. Trunnion equipped container 33 includes opposing shorter side walls 39, 31 and a front wall 45 joining side walls 39, 41. Trunnion rods 35, 37 extend from opposing ends of the container 33 near the top 47 of front wall 45. Trunnion equipped container 33 is commonly known as a rear end load container and is used primarily with rear loading collection bodies with the rear loading container intended to be unloaded into a trough carried at the rear of a conventional rear end loading collection body. The usual trunnion equipped container 33 is supported on wheels 43.

Invention fork assembly 10 is removable from antis 3, 5 and includes an elongate trunnion tube 12 to which are fixed fork pivot levers 16, 18 which may be joined to cylinder mounts 27, 29 on arms 3, 5 by fork lift hydraulic cylinders which are omitted from the illustration of FIG. 1, but are well known in the front loading collection body industry. Operation of the fork lift cylinders permits the forks 6, 8 to be moved upward and downward under control by the operator, rotating about the longitudinal axis of the main trunnion tube 12. Fork assembly 10 also includes an upright elongate generally planar frame 14 securely fixed to trunnion tube 12 by stand off members 20, 22.

Figure 2:
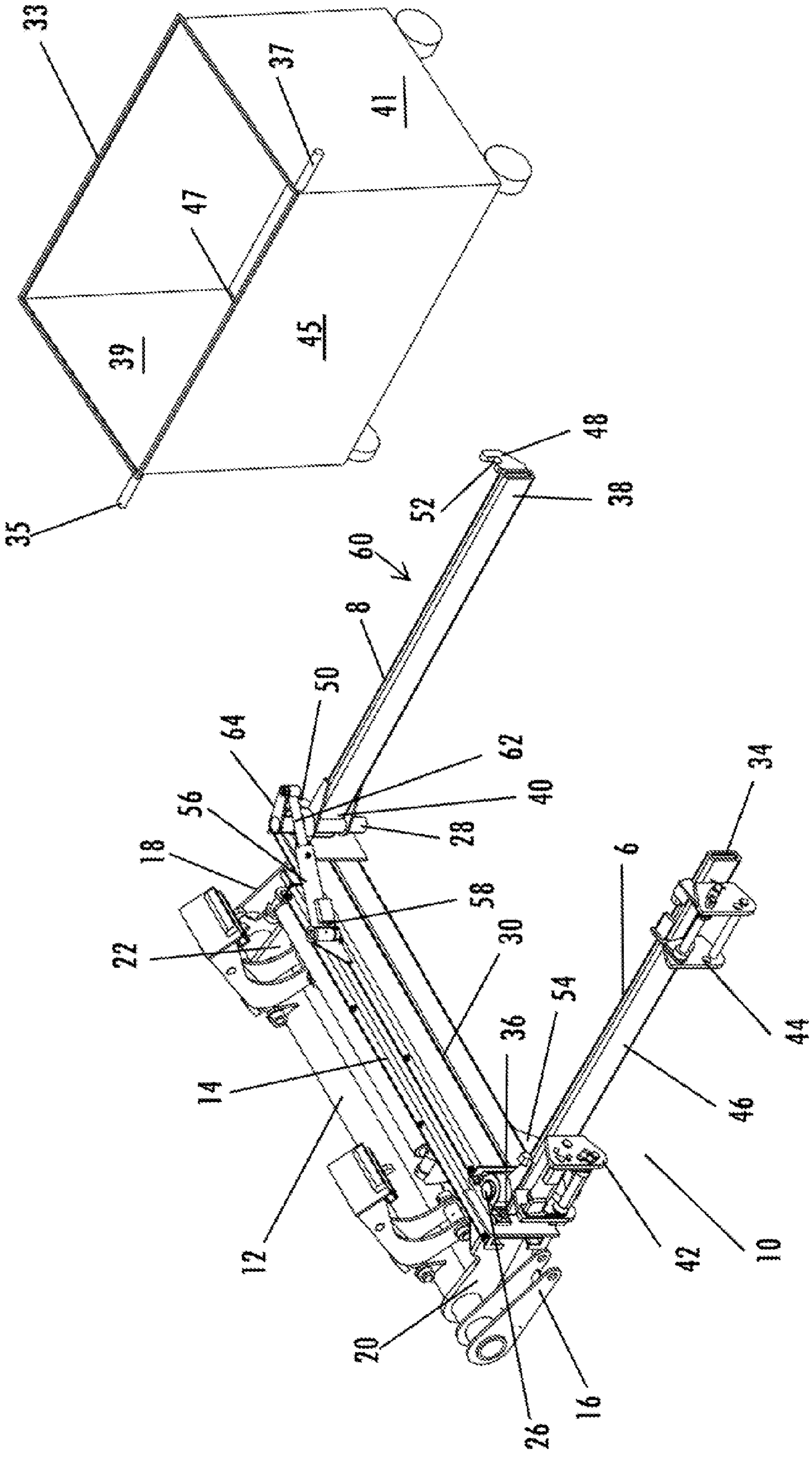
FIG. 2 is a perspective of the apparatus of the present invention isolated from the collection body.
Figure 3:
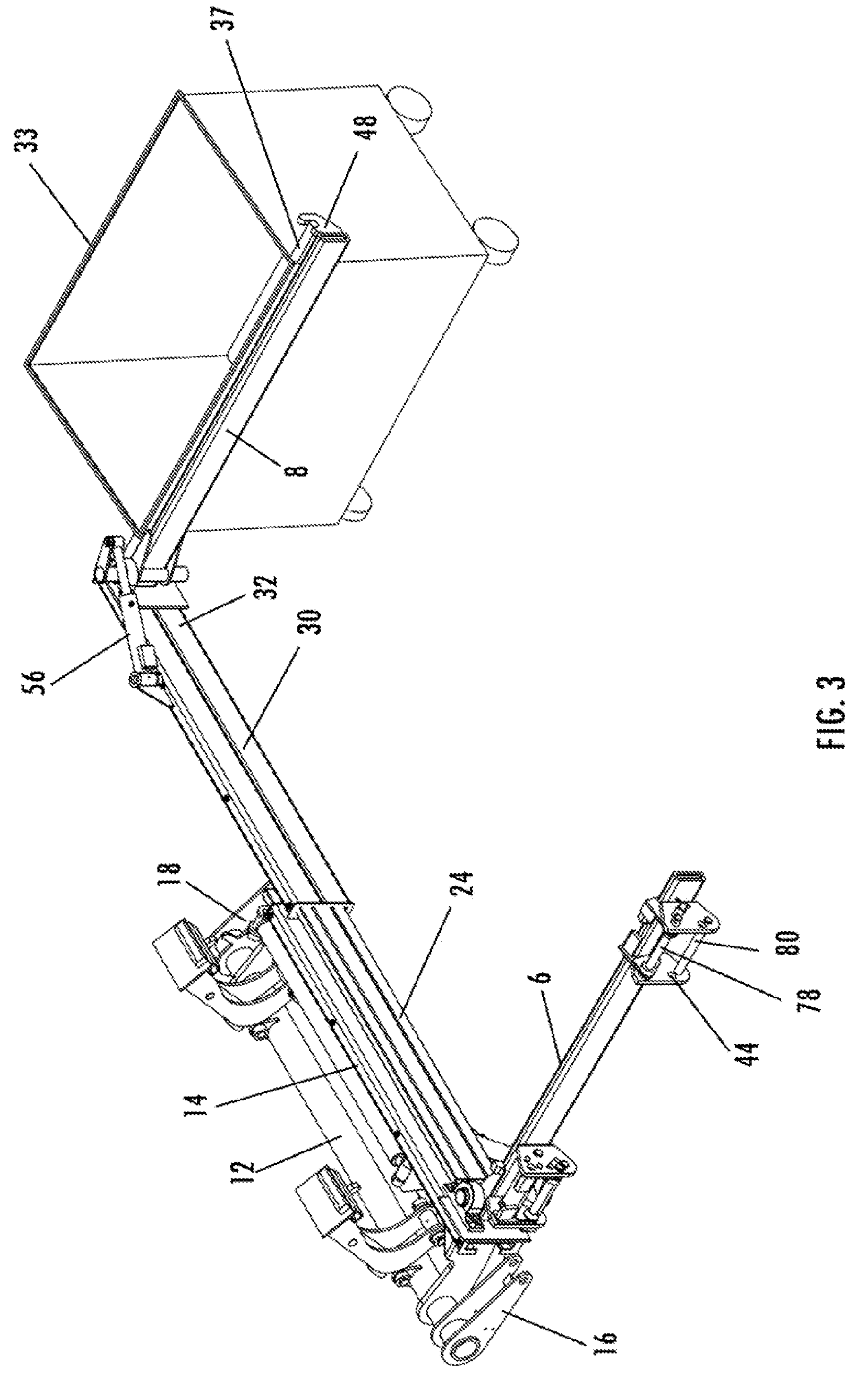
FIG. 3 is a perspective of the invention with its street side fork shown in a laterally extended position and with a trunnion equipped container connected to the street side fork of the apparatus.
Figure 4:
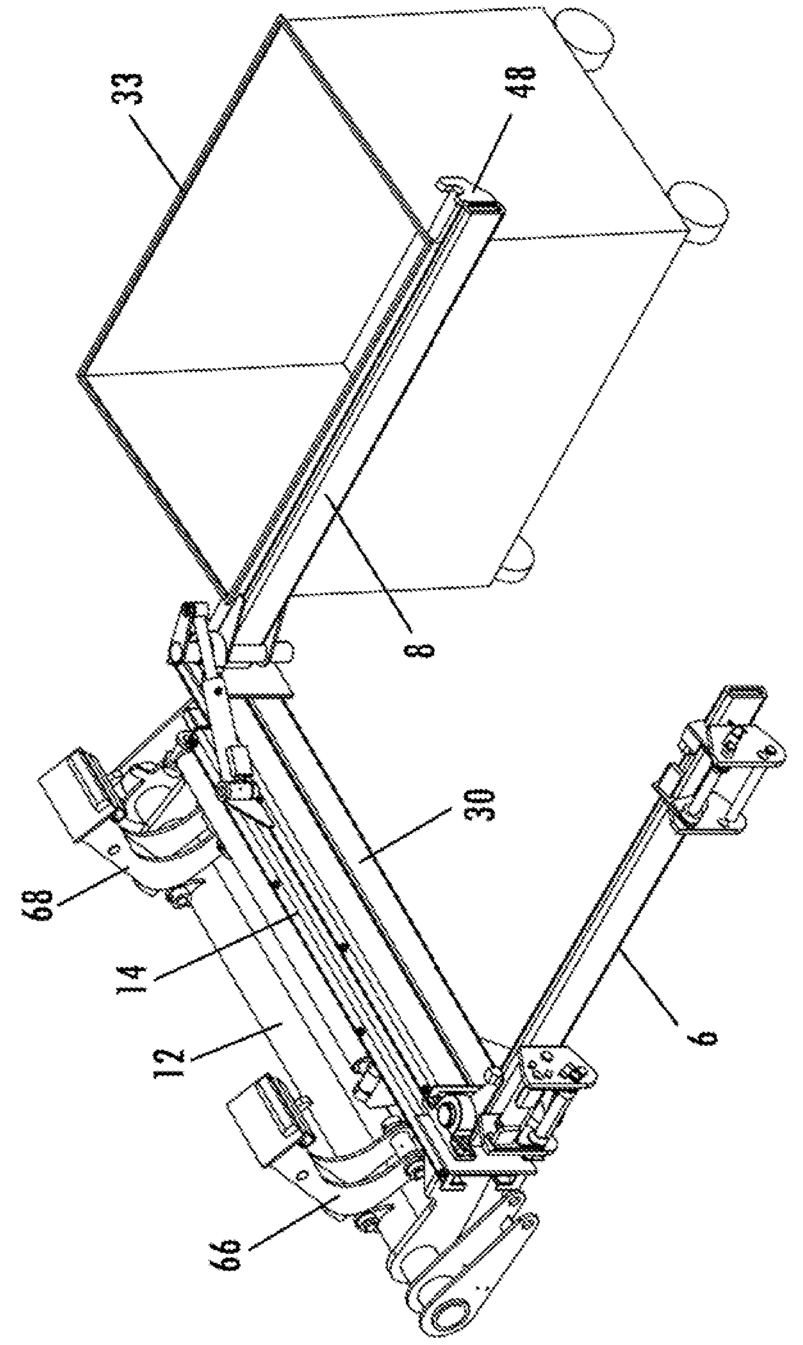
FIG. 4 is a perspective of the invention as illustrated in FIG. 3 except with the street side fork returned to its retracted position.

Frame 14 supports curbside fork 6 as well as an elongate rail 24 which extends along generally the full length of frame 14. An elongate sleeve 30 is selectively slidable along rail 24 by action of a hydraulic, cylinder driver which may locate sleeve 30 at any position along rail 24. Street side fork 8 is supported on sleeve 30 at a first end 32 thereof. Street side fork 8 may thereby be moved from a retracted position as seen in FIG. 2 to an extended position as seen in FIG. 3 in order to reach out toward a container such as trunnion equipped container 33 which is spaced away from street side fork 8 when street side fork 8 is in the retracted position. It is to be understood that sleeve 30 can be moved to any position along rail 24 as needed to extend street side fork 8 to an advice icy with a container resting nearby.

Curbside fork 6 and street side fork 8 may be mirror images or may be different as with the embodiment shown in FIGS. 1-7. Curbside fork 6 is equipped with hook receivers 42, 44 which may engage hooks on a conventional hook equipped side loading refuse container. The hook receivers 42, 44 are spaced apart along curbside fork 6 at its curb side 46. Hook receivers 42, 42 are spaced apart at a distance appropriate to engage hooks on the front wall of a conventional side load container (not shown) with the distal hook receiver 44 positioned near the free end 34 of curbside fork 6. Proximal hook receiver 44 is located adjacent hinge end 36 of curbside fork 6. Hook receivers 42, 44 may be selectively relocated along curbside fork 6 but are locked along, curbside fork 6 when relocation is complete. Hook receivers 42, 44 may be removed from curbside fork 6.

Curbside fork 6 is hinged to frame 14 by pivot axle 26 which is vertically oriented when arms, 3, 5 are in the lowered position seen in FIGS. 1-7. The longitudinal axis of pivot axle 26 is transverse to the longitudinal axis of frame 14. A drive cylinder 54 may selectively rotate curbside fork 6 about axle 26. The range of motion of curbside fork 6 about pivot axle 26 is approximately 90 degrees.

Street side fork 8 is hinged at its hinge end 40 to sleeve 30 and is selectively movable by action of drive cylinder 56 which is mounted at its base 58 to sleeve 30 and at its rod end 62 to lever member 64 which pivots about pivot axle 28 along with street side fork 8. Pivot of street side fork 8 is selective, under control of an operator.

The longitudinal axes of the pivot axles 26, 28 are both transverse to the longitudinal axis of frame 14.

Street side fork 8 is equipped on its street side 60 with trunnion hooks 48, 50 located at the respective ones of its free end 38 and its hinge end 40. Each of trunnion hooks 48, 50 supports an open topped trunnion pocket 52. Trunnion rods 35, 37 of rear end load container 33 may be received in open topped trunnion pockets 52.

Figure 5:
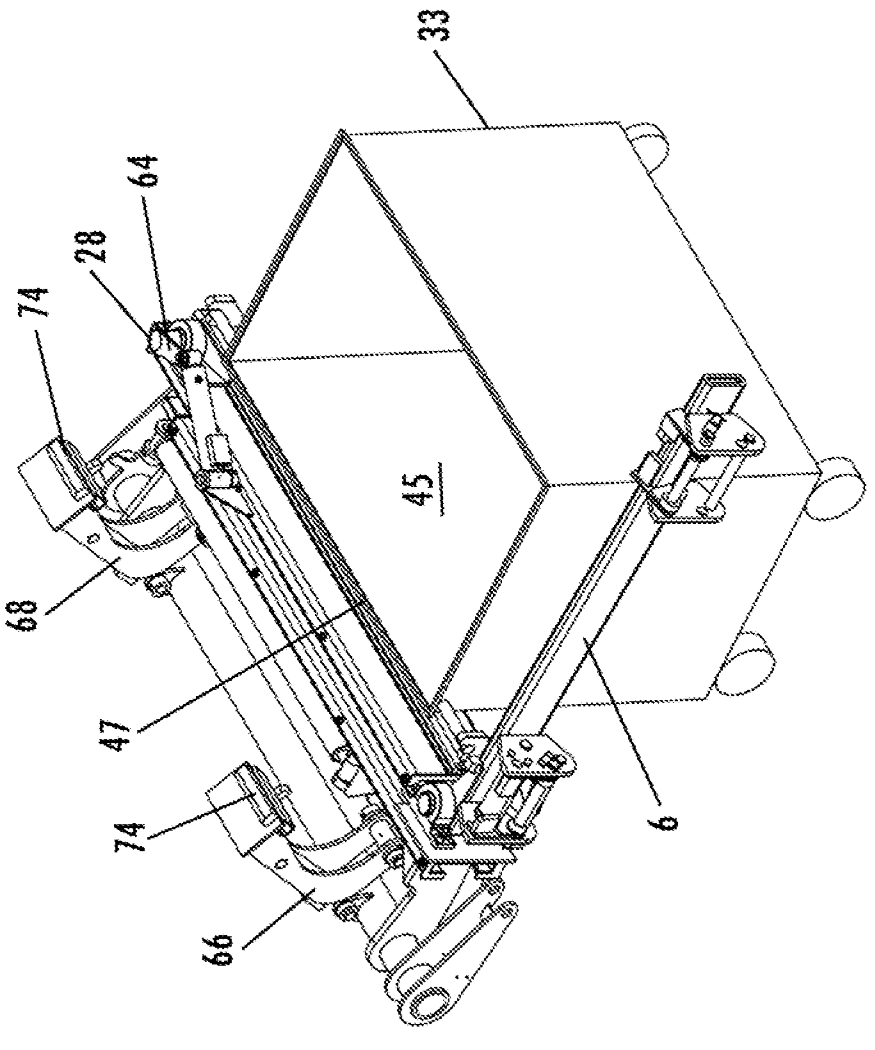
FIG. 5 is a front perspective of the invention with the street side fork and attached trunnion equipped container rotated to the folded position parallel to and alongside the fork trunnion.
Figure 6:
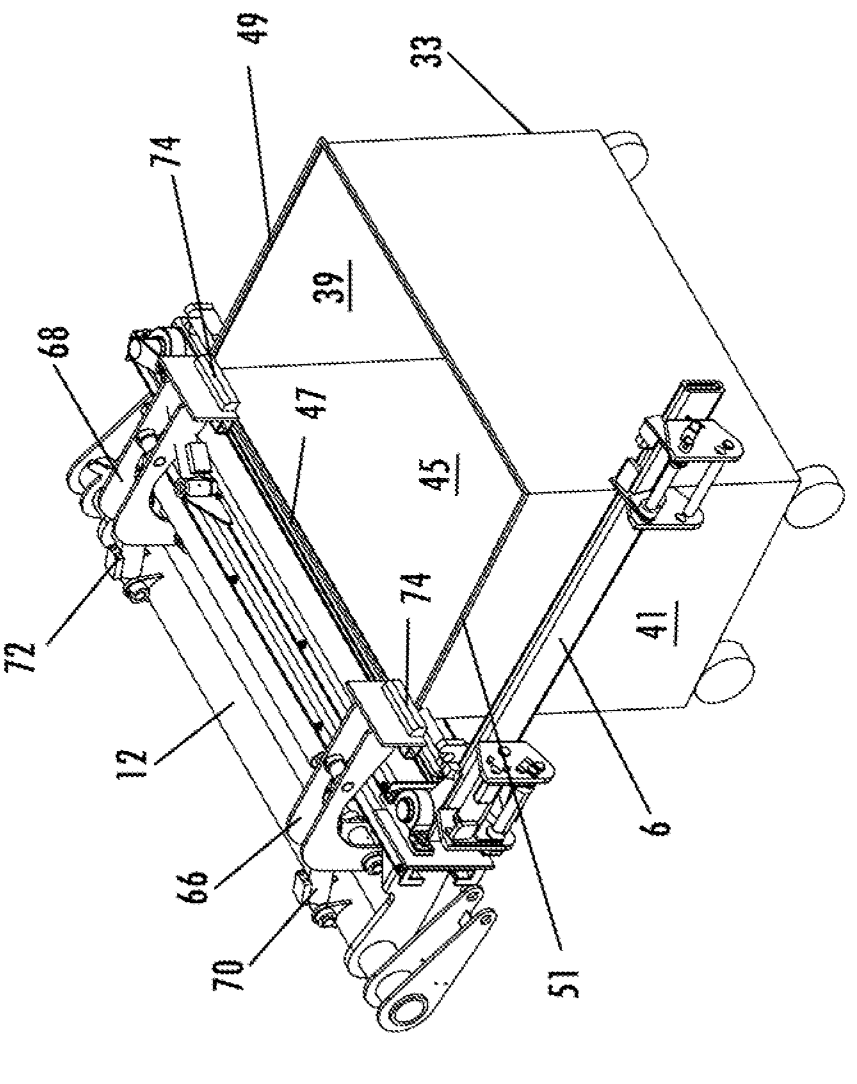
FIG. 6 is a front perspective of the invention as seen in FIG. 5 but with the lock arms of the invention lowered to lock the trunnion equipped container to the invention such that the invention may be raised for dumping the contents of the trunnion equipped container.
Figure 7:
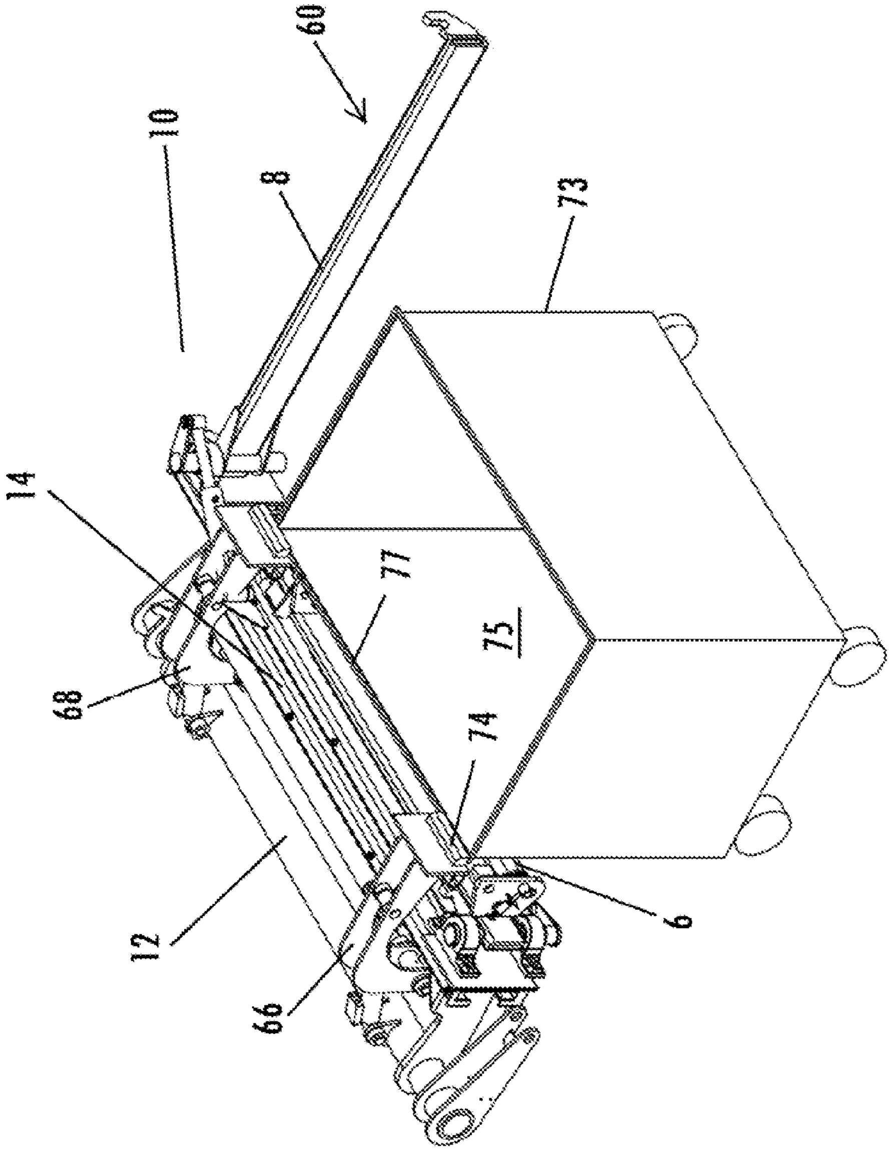
FIG. 7 is a perspective of the invention of the present invention, with the curb side fork rotated to its folded position and with the lock arm lowered to engage and lock a hook equipped container to the fork assembly invention.

In the embodiment illustrated in FIGS. 1-7, street side fork 8 may be selectively pivoted about its pivot axle 28 at its hinge end 40 from an open position substantially perpendicular to frame 14 to a folded position alongside and substantially parallel to sleeve 30 and to frame 14 as seen in FIG. 5. Pivot axle 28 is transverse to the longitudinal axis of sleeve 30. Similarly, curbside fork 6 may be selectively pivoted about its pivot axle 28 from an open position substantially perpendicular to frame 14 to a folded position alongside and substantially parallel to sleeve 30 and to frame 14 as seen in FIG. 7.

Trunnion hooks 48, 50 of street side fork 8 are mounted to the street side 60 of street side fork 8 and are spaced apart slightly more than the width of the standard trunnion equipped container 33 such that trunnion rods 35, 37 will fit into open topped trunnion pockets 52, one of which being located on each hook member 48, 50. (The trunnion pocket 52 of hook member 50 is not visible in the figures.) Because pivot fork assembly 10 can be raised and lowered by lift arms 3, 5, it can be understood that trunnion rods 35, 37 may be located into trunnion pockets 52 without operator intervention other than through cab control of the lift arms 3, 5 and maneuvering of the truck on which the collection body 2 is carded for placement of the street side fork 8 generally parallel to and alongside front wall 45 of trunnion equipped container 33. By raising and lowering the fork assembly 10 while the street side fork 8 is pivoted to its open position and telescoped sufficiently outward to reach trunnion equipped container 33, the trunnion pockets 52 may be located below the trunnion rods 35, 37 and then the pivot fork assembly 10 may be raised to locate the trunnion rods 35, 37 in trunnion pockets 52.

FIG. 3 illustrates that street side fork 8 can be moved toward and positioned generally parallel to trunnion equipped container 33 by moveable sleeve 30 being telescopingly slidable longitudinally on rail 24 as desired, under control of the operator who may remain in the truck cab while causing street side fork 8 to be moved toward trunnion equipped container 33.

Referring now particularly to FIGS. 5 and 6, it can be observed that trunnion equipped container 33 has been drawn by street side fork 8 into a substantially parallel relationship and adjacency with frame 14. Trunnion rods 35, 37 remain within trunnion pockets 52 on trunnion hooks 48, 50. An optional fork rest or catch (not illustrated) may be provided on slidable sleeve 30 to assist in supporting five end 38 of street side fork 8 when it is pivoted into the folded position seen in FIGS. 5-6. Curbside fork 6 remains unfolded and extends perpendicularly from frame 14 when street side fork 8 is rotated into the folded position. In FIG. 5, lock down arms 66, 68 remain in the raised position such that no interference with the folding; operation of street side fork 8 may occur. Each lock down arm 66, 68 is pivotable within a substantially vertical plane and is selectively driven by a hydraulic cylinder 70, 72. The hydraulic cylinders 70, 72 are each anchored to trunnion tube 12. In FIG. 6, lock down arms 66, 68 are shown in the clamping position each lock arm 66, 68 having been lowered by extension of lock down hydraulic cylinders 70, 72 respectively. Lock arms 66, 68 are intended to operate together. When in the lowered position, pads 74 on each of lock down arms 66, 68 press against the top edge 47 of front wall 45 as well as a portion of each of top edges 49, 51 of opposing sidewalls 39, 41 of trunnion equipped container 33 thereby preventing trunnion rods 35, 37 from escaping trunnion pockets 52 when the trunnion equipped container 33 is upended.

FIG. 7 illustrates the use of pivot fork assembly 10 with a hook equipped side loading container 73 having a front wall 75 on which hooks (not visible) are provided. The hooks are well known in the industry as standard on side loading refuse containers and generally are shaped to have open bottom slots for receiving the rungs 78, 80 (see FIG. 2) of each hook receiver 42, 44. It should be easily understood that a truck carrying collection body 2 equipped with the pivot fork assembly 10 of this invention will typically be expected to operate on the right hand side of a roadway and therefore the curbside fork 6, in its unfolded position as see in FIGS. 1-6, will be easily maneuverable into position adjacent and generally parallel to the front wall 75 of a hook equipped container 73 such that hook receivers 42, 44 (see FIG. 2) may be placed below the hooks of the conventional hook equipped container 73 and raised by operation of main lift arms 3, 5 such that hook receivers 42, 44 capture the hooks fixed to the outside of front wall 75 of container 73 on rungs 78, 80 of hook receiver 47, 44. The curbside fork 6 may then be folded around pivot axle 26 into the folded position thereby locating front wall 75 of container 73 generally parallel to the frame 14. Then lock down arms 66, 68 may be lowered to press against the top edge 77 of front wall 75. The fork assembly 10 may then be raised by lift arms 3, 5 such that the hook equipped container 73 may be upended over load opening 7 of collection body 2.

An optional fork support member (not illustrated) may be provided on sleeve 30 or on frame 14 to support the free end 34 of curbside fork 6 when it is moved to the folded position seen in FIG. 7.

Having thus described the invention in connection with the embodiment thereof, it will be evident to those skilled in the art that various revisions can be made to the several embodiments described herein without departing from the spirit and scope of the invention. It is intended, however, that all such revisions and modifications that are evident to those skilled in the art will be included within the scope of the following claims. Any elements of a embodiments disclosed herein can be used in combination with any elements of other embodiments disclosed herein in any manner to create different embodiments.

The invention claimed is:

1. In a commodity collection body having lift arms movable from a lowered position forward of the commodity collection body to a raised position above a load opening of the commodity collection body, each of the lift arms having a fork lift cylinder attached therealong, an improvement comprising a fork assembly mounted to the lift arms,
an elongate main frame extending between the lift arms,
the main frame supporting a first fork selectively pivotable about a first axle supported on the main frame,
the first axle having a longitudinal axis transverse to a longitudinal axis of the frame,
the first fork including trunnion pockets on a street side thereof,
the trunnion pockets adapted to selectively receive trunnion rods extending from a first side of a trunnion equipped refuse container,
at least one lock down arm pivotable between an open position and a closed position,
the at least one lock down arm touchingly engaging a top edge of the trunnion equipped refuse container,
wherein the lift arms may selectively lift and upend the trunnion equipped refuse container over the load opening of the commodity collection body;
a second fork is supported on the main frame and is pivotable about a second axle,
the second fork spaced apart from the first fork,
the second axle having a longitudinal axis transverse to a longitudinal axis of the frame;
the fork assembly includes a main trunnion tube having lever members extending therefrom,
the main frame supported on the main trunnion tube,
the main frame substantially parallel with the main trunnion tube,
the lever members adapted for rotating the main trunnion tube responsive to operation of the fork lift cylinders of the lift arms.

2. The improvement of claim 1 wherein
an extendible member is mounted to the main frame,
the extendible member substantially parallel to the main frame and selectively moveable therealong,
the first fork supported on the extendible member,
the first axle supported on the extendible member.

3. Apparatus to collect waste materials comprising
a collection body having a load opening at a top thereof,
the collection body including a pair of main lift arms pivotable thereon,
each main lift arm including a free end,
the free end of each main lift arm movable between a lowered position forward of the collection body and a raised position adjacent the load opening, a fork assembly removably mounted to the free ends of the main lift arms,
the fork assembly comprising an elongate frame,
the frame supporting a first fork,
the first fork hinged at a hinge end thereof to the elongate frame,
the first fork movable from an open position generally perpendicular to a longitudinal axis of the frame to a folded position generally parallel to and adjacent the frame,
the first fork including a pair of spaced apart refuse container engaging elements thereon,
the refuse container engaging elements of the first fork comprising hook engaging members;
a second fork supported on the frame and spaced on the frame apart from the first fork,
the second fork hinged at a hinge end thereof to the elongate frame,
each of the first fork and the second fork independently movable from an open position generally perpendicular to a longitudinal axis of the frame to a folded position generally parallel to and adjacent the frame,
the second fork including a pair of spaced apart trunnion receiving pockets thereon,
wherein trunnion rods extending from a front wall of a real end load container may be received in the trunnion receiving pockets of the at least one of the first fork and the second fork;
an elongate rail member is mounted to the frame, the elongate rail member generally parallel to the frame,
a movable member selectively slidable along the rail member,
the first fork is a curbside fork,
the second fork is a street side fork,
the street side fork hinged to the movable member.

4. The apparatus of claim 3 further comprising
at least a first lock down arm supported on the frame,
the at least a first lock down arm selectively movable from an unlocked position to a locked position,
the at least a first lock down arm touchingly engageable with a top edge of a wall of a refuse container attached to the first fork when the at least a first lock down arm is in the locked position,
wherein the at least a first lock down arm when in the locked position prevents disengagement of the refuse container from the first fork.

5. The apparatus of claim 3 wherein
the second fork supported on the movable member at its hinge end,
the hinge end of the second fork supported by a pivot axle supported on the movable member,
the pivot axle having a longitudinal axis transverse to a longitudinal axis of the frame.

6. The apparatus of claim 3 wherein
the movable member is an elongate sleeve,
the elongate sleeve selectively movable along the rail member from a retracted position alongside the frame to an extended position extending from the rail member,
the elongate sleeve selectively positionable at any location between the retracted position and the extended position.

7. Adapter apparatus for a front loading commodity collection body having a pair of lift arms movable from a lowered position forward of the collection body to a raised position adjacent a load opening at a top of the collection body, comprising
an elongate frame extending between free ends of the lift arms,
a first fork member supported on the frame,
the first fork member pivotal on the frame between a position perpendicular to a longitudinal axis of the frame to a folded position alongside the frame and substantially parallel thereto,
the first fork member including refuse container engaging members thereon,
the container engaging members of the first fork member spaced apart along the first fork member,
a second fork member supported on the frame and spaced apart from the first fork member,
the second fork member selectively pivotal from a first position perpendicular to the longitudinal axis of the frame and a second position alongside the frame and substantially parallel thereto;
the second fork member includes refuse container engaging members thereon,
the container engaging members of the second fork member spaced apart along the second fork member,
the container engaging members of the second fork member adapted to engage a commercial refuse container having trunnion rods extending from opposing ends thereof,
the container engaging members of the first fork member adapted to engage a commercial refuse container having hooks on a first wall thereof;
the container engaging members of the second fork member are selectively movable along the second fork member.

8. The apparatus of claim 7 further comprising
a laterally extendible assembly mounted to the frame,
the extendible assembly comprising a stationary member affixed to the frame and a movable member selectively slidable along the stationary member,
the first fork member supported on the movable member,
the first fork member pivotal about a first pivot axle supported on the movable member.

9. The apparatus of claim 7 further comprising
a laterally extendible assembly mounted to the frame,
the extendible assembly comprising a rail affixed to the frame and an elongate sleeve selectively slidable along the rail,
the first fork member supported on the elongate sleeve,
the first fork member pivotal about a first pivot axle supported on the elongate sleeve,
the second fork member pivotal about a second pivot axle supported on the elongate frame.

10. The apparatus of claim 9 further comprising
a main trunnion tube detachably attached to the free ends of the lift arms,
the main trunnion tube having lever members extending therefrom,
the elongate frame supported on the main trunnion tube,
the elongate frame substantially parallel with the main trunnion tube,
the lever members adapted for rotating the main trunnion tube responsive to operation of fork lift cylinders supported on the lift arms.

11. The apparatus of claim 10 wherein
the container engaging members of the second fork member comprising trunnion receiving pockets mounted to a street side of the second fork member,
the container engaging members of the first fork member adapted to engage a commercial side load refuse container, the container engaging members of the first fork member comprising rungs to receive hooks of the commercial side load refuse container, a second lock down arm is selectively movable from an open position to a closed position, each of the at least a first lock down arm and the second lock down arm movable within substantially vertical planes, each of the at least a first lock down arm and the second lock down arm having pads on free ends thereof, the pads adapted to touchingly engage top edges of opposing sides of a commercial refuse container engaged with a one of the first fork member and the second fork member.

12. In a commodity collection body having lift arms movable from a lowered position forward of the commodity collection body to a raised position above a load opening of the commodity collection body, each of the lift arms having a fork lift cylinder attached therealong, an improvement comprising a fork assembly mounted to the lift arms, an elongate main frame extending between the lift arms, the main frame supporting a first fork selectively pivotable about a first axle supported on the main frame, the first axle having a longitudinal axis transverse to a longitudinal axis of the frame, the first fork including trunnion pockets on a street side thereof, the trunnion pockets adapted to selectively receive trunnion rods extending from a first side of a trunnion equipped refuse container, at least one lock down arm pivotable between an open position and a closed position, the at least one lock down arm touchingly engaging a top edge of the trunnion equipped refuse container, wherein the lift arms may selectively lift and upend the trunnion equipped refuse container over the load opening of the commodity collection body;

an extendible member is mounted to the main frame, the extendible member substantially parallel to the main frame and selectively moveable therealong, the first fork supported on the extendible member, the first axle supported by the extendible member, a second fork is supported on the main frame and is pivotable thereon about a second axle, the second fork spaced apart from the first fork, the second axle having a longitudinal axis transverse to a longitudinal axis of the extendible member.

13. In a commodity collection body having lift arms movable from a lowered position forward of the commodity collection body to a raised position above a load opening of the commodity collection body, each of the lift arms having a fork lift cylinder attached therealong, an improvement comprising a fork assembly mounted to the lift arms, an elongate main frame extending between the lift arms, the main frame supporting a first fork selectively pivotable about a first axle supported on the main frame, the first axle having a longitudinal axis transverse to a longitudinal axis of the frame, the first fork including trunnion pockets on a street side thereof, the trunnion pockets adapted to selectively receive trunnion rods extending from a first side of a trunnion equipped refuse container, at least one lock down arm pivotable between an open position and a closed position, the at least one lock down arm touchingly engaging a top edge of the trunnion equipped refuse container, wherein the lift arms may selectively lift and upend the trunnion equipped refuse container over the load opening of the commodity collection body;

a second fork is supported on the main frame and is pivotable about a second axle, the second fork spaced apart from the first fork, the second axle having a longitudinal axis transverse to a longitudinal axis of the frame;

an elongate rail is mounted to the main frame, the elongate rail substantially parallel to the main frame, a sleeve selectively slidable along the elongate rail in a generally horizontal direction, the first fork supported on the sleeve, the first axle supported on the sleeve.

* * * * *